United States Patent
Newman

[19]

[11] Patent Number: 5,950,300
[45] Date of Patent: Sep. 14, 1999

[54] STATOR COIL LEAD TERMINATION METHOD AND APPARATUS

[75] Inventor: Lawrence E. Newman, Tipp City, Ohio

[73] Assignee: Globe Products Inc., Huber Heights, Ohio

[21] Appl. No.: 08/959,492

[22] Filed: Oct. 28, 1997

Related U.S. Application Data

[60] Provisional application No. 60/029,513, Oct. 28, 1996.

[51] Int. Cl.$^6$ .................................................. H02K 15/09
[52] U.S. Cl. .................. 29/596; 29/732; 29/736; 242/432.2; 242/432.6
[58] Field of Search .............................. 29/596, 597, 598, 29/732, 736; 242/432.2, 432.6

[56] References Cited

U.S. PATENT DOCUMENTS

| | | |
|---|---|---|
| 3,747,187 | 7/1973 | Colwell . |
| 4,000,764 | 1/1977 | Reiger, Jr. . |
| 4,074,418 | 2/1978 | Pearsall . |
| 4,951,379 | 8/1990 | Clemenz . |
| 4,969,606 | 11/1990 | Santandrea et al. . |
| 4,997,138 | 3/1991 | Luciani et al. . |
| 5,090,107 | 2/1992 | Beakes et al. . |
| 5,090,108 | 2/1992 | Banner et al. . |
| 5,214,838 | 6/1993 | Beakes et al. . |
| 5,341,997 | 8/1994 | Luciani . |
| 5,495,659 | 3/1996 | Beakes et al. . |
| 5,535,503 | 7/1996 | Newman . |
| 5,685,061 | 11/1997 | Beaks . |
| 5,755,021 | 5/1998 | Beakes . |

FOREIGN PATENT DOCUMENTS

WO 96/34446   10/1996   WIPO .

OTHER PUBLICATIONS

Commonly owned utility application serial No. 09/028,437 filed Feb. 24, 1998.

*Primary Examiner*—Carl E. Hall
*Attorney, Agent, or Firm*—Roger S. Dybvig

[57] ABSTRACT

For use with a robot having an end effector for connecting stator coil lead wires to trough-shaped terminals, tamper members are slidably mounted on a terminal crimping and lead wire cutting member. Air actuators drive the tamper members toward the terminals when the end effector is manipulated to place the lead wires into the terminal troughs.

4 Claims, 6 Drawing Sheets

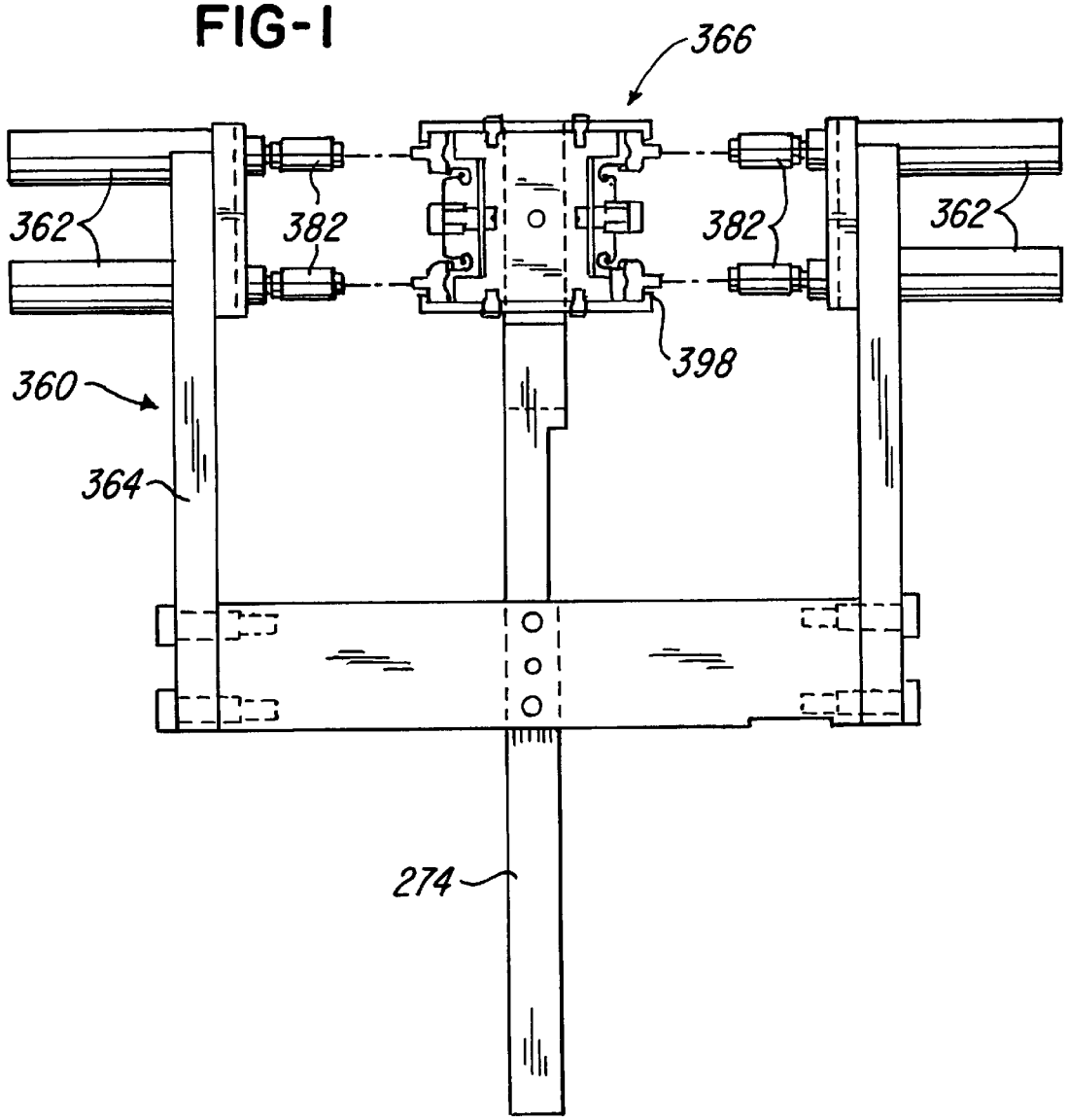

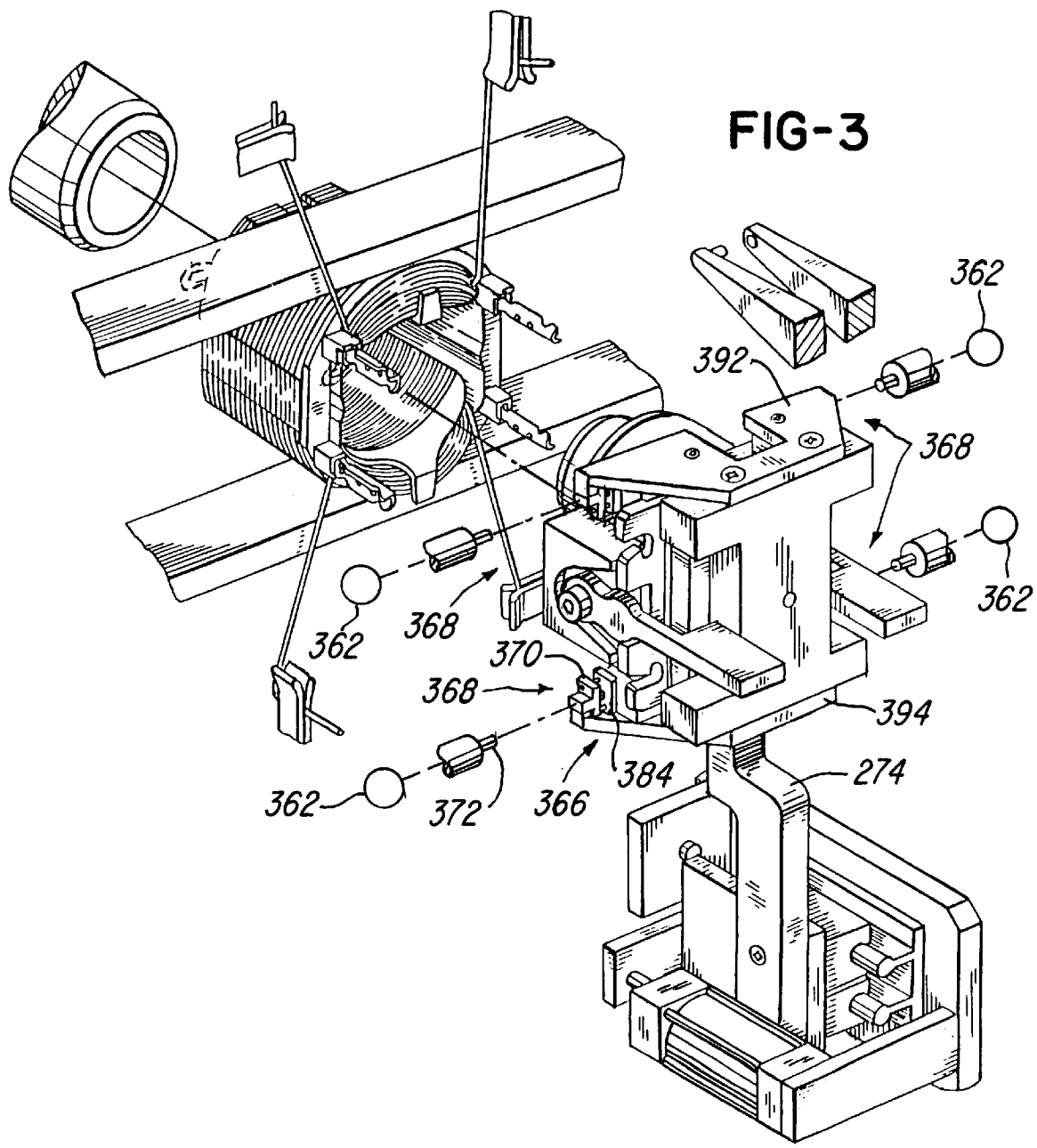

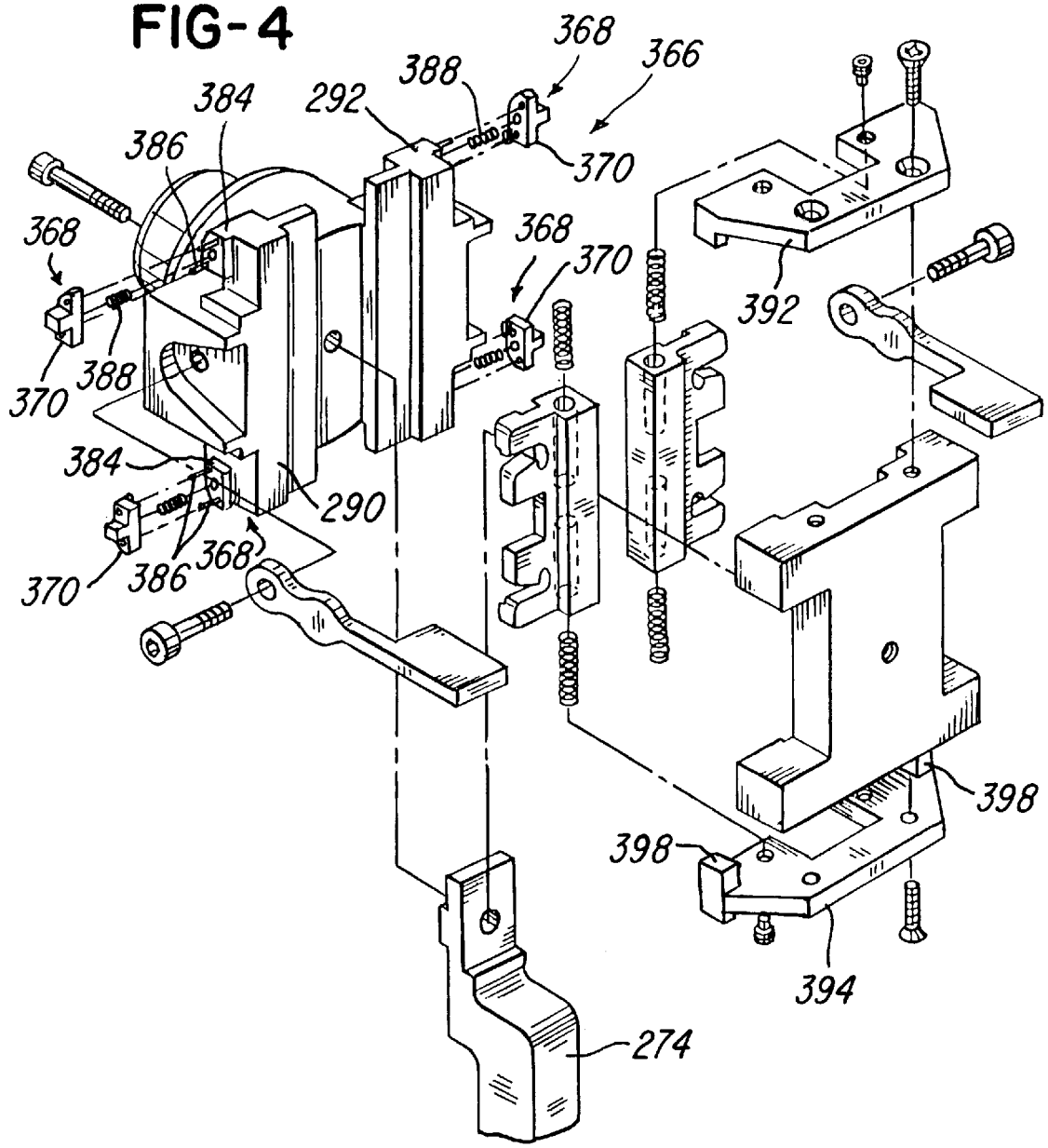

STATOR COIL LEAD TERMINATION METHOD AND APPARATUS

CROSS-REFERENCE TO RELATED APPLICATION

This application claims the benefit of copending U.S. Provisional Application No. 60/029,513, filed Oct. 28, 1996.

INCORPORATION BY REFERENCE

U.S. Pat. No. 5,090,108 is hereby incorporated by reference herein.

FIELD OF THE INVENTION

This invention relates to a stator coil lead termination method and apparatus particularly useful for the manufacture of stators for universal electric motors and may be useful for the manufacture of other electrical devices.

BACKGROUND OF THE INVENTION

FIGS. 16 through 30 of U.S. Pat. No. 5,090,108, show a tooling assembly 260 that includes a terminal crimping and wire cutting fixture 272 affixed to the top of a stanchion 274 mounted on a carriage 276 that is driven toward and away from a stator 40 supported in a stator lead terminating station 62 by means of a tooling actuator 278. The tooling assembly 260 is used in conjunction with an industrial robot for placing stator coil lead wires into terminals having trough-like, longitudinally-extending, wire-receiving channels mounted in terminal-receiving sockets mounted on an end face of a stator core, and for crimping the lead wires in the terminals.

Some stator coil terminal connections are difficult if not impossible to obtain on a reliable production basis using the tooling assembly 260. In particular, there are termination requirements that make it difficult to lay coil lead wires into the terminal troughs in such a fashion that the lead wires are inserted into the bottoms of the terminal troughs and reliably remain in the terminal troughs until the lead wires are crimped to the terminals.

SUMMARY OF THE INVENTION

In accordance with this invention, a tooling assembly including an improved terminal crimping and wire cutting fixture is provided which, in addition to the features of the fixture 272 shown in U.S. Pat. No. 5,090,108, includes wire tamper assemblies, each having an air actuator for driving the tamper blade into engagement with a coil lead wire when needed during the process of inserting the coil lead into a coil lead-receiving terminal mounted on an end face of a stator core. In addition, the tooling assembly of this invention drives the coil lead wires into a positions in which the robot can assuredly lay sections of the lead wires into a terminal trough.

Other objects and advantages will become apparent from the following description and the accompanying drawings.

BRIEF DESCRIPTION OF THE DRAWINGS

FIG. 1 is a rear elevational view of a tooling assembly of this invention.

FIG. 3 is a simplified, fragmentary, and partly exploded perspective view similar to FIG. 16 of U.S. Pat. No. 5,090, 108, but showing, partly schematically, the improved apparatus of this invention.

FIG. 4 is a fragmentary, exploded perspective view similar to FIG. 30 of U.S. Pat. No. 5,090,108, of the improved terminal tab crimping and lead wire cutting mechanism of this invention.

FIGS. 6, 6A, 6B, 6C, 6D, and 6E are various views of a slidable tamper member of this invention.

FIG. 7-1 is an elevational view of the tamper member of FIG. 6 as viewed in the direction of arrows 7—7 of FIG. 6E.

FIG. 7-2 is an elevation view similar to FIG. 7-1, but showing a tamper member located on the opposite side of the terminal tab crimping and lead wire cutting mechanism.

DETAILED DESCRIPTION

Substantial portions of the apparatus of this invention are identical, or at least functionally identical, to portions of the apparatus illustrated and described in relation to FIGS. 16 through 30 of said U.S. Pat. No. 5,090,108, and like parts are given like reference numbers.

Figure 2:
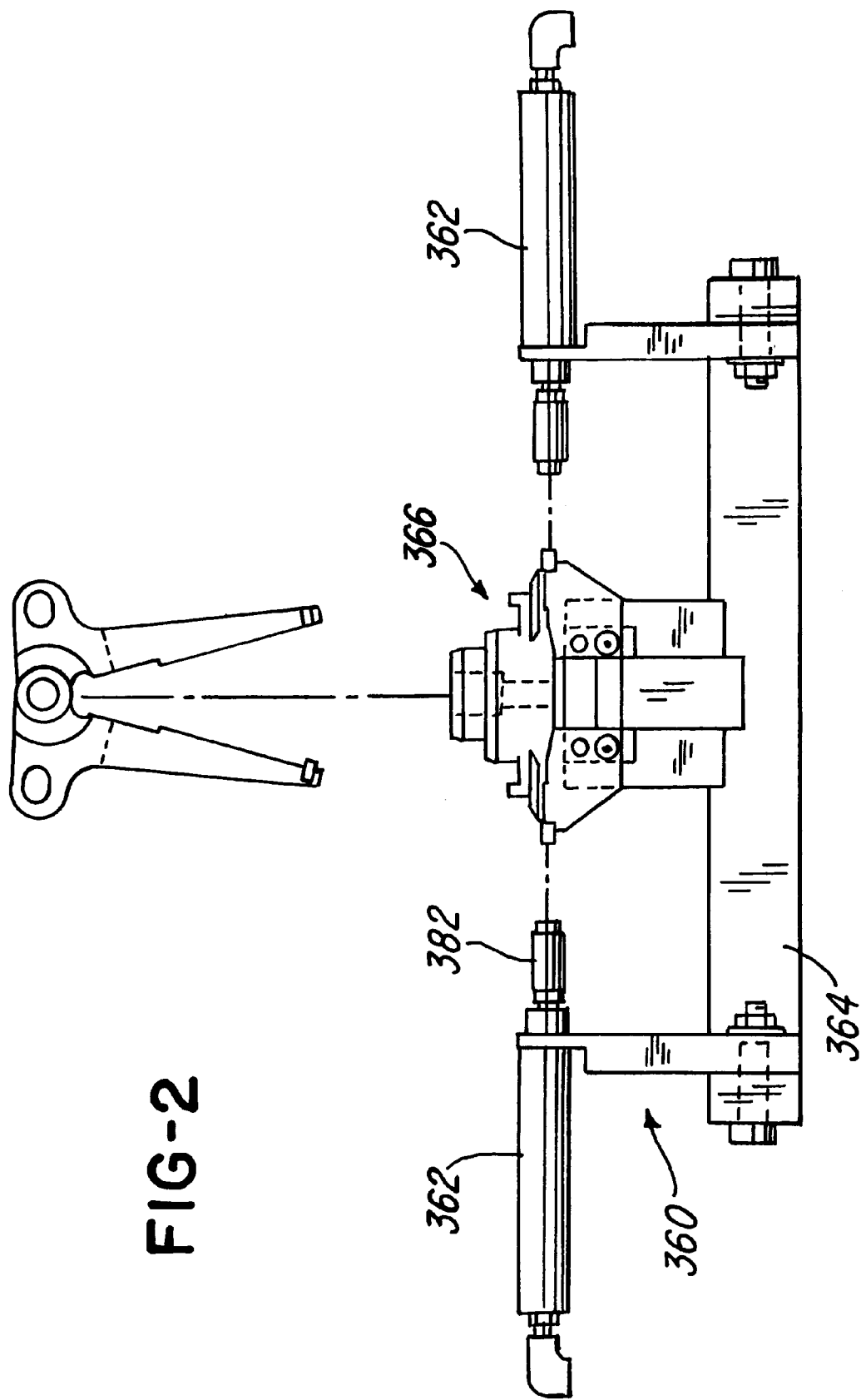
FIG. 2 is a plan view of the tooling assembly of FIG. 1. and further illustrates a portion of an industrial robot used with the tooling assembly.
Figures 1, 7:
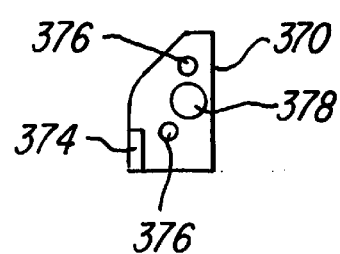
Figures 2, 7:
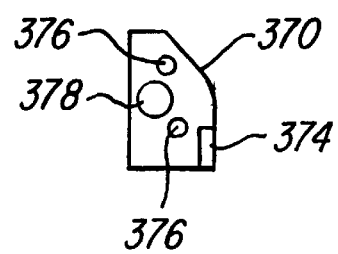
Figure 6A:
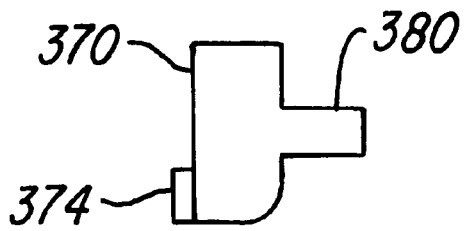
Figure 6B:
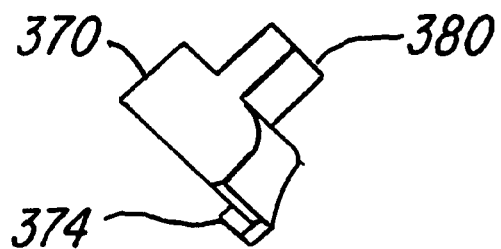
Figure 6C:
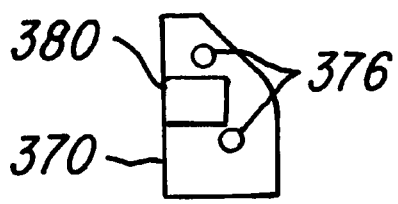
Figure 6D:
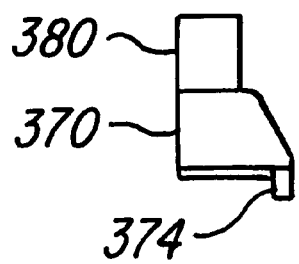
Figure 6E:
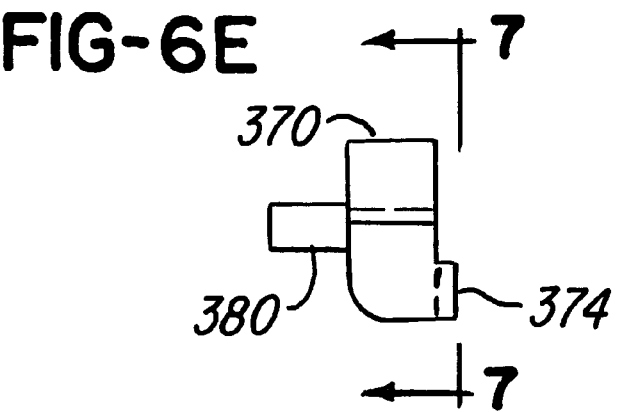

In accordance with this invention, with reference to FIGS. 1 and 2, the tooling assembly, designated 360 herein, may be essentially identical to the tooling assembly 260 of U.S. Pat. No. 5,090,108 except for the addition of four single-acting air actuators 362 mounted on a U-shaped frame 364 mounted on the stanchion 274 and except for modifications to the terminal tab crimping and lead wire cutting mechanism 272, as discussed below.

With reference to FIGS. 3 and 4, the terminal tab crimping and lead wire cutting mechanism, generally designated 366, of this invention, differs from the corresponding mechanism 272 of the U.S. Pat. No. 5,090,108, in that the mechanism 366 of the instant invention is provided with four wire tamper assemblies, generally designated 368, each having a slidable tamper member, generally designated 370, which is driven by the piston rod 372 of an air actuator 362 aligned therewith so that a tooth-like tamper blade 374 (FIGS. 6A through 6E and FIGS. 7-1 and 7-2) forming a part of the tamper member 370 engages a stator coil lead wire when needed during the process of inserting the coil lead into a coil lead-receiving terminal 52 mounted on an end face of the stator core 40.

With reference to FIGS. 6A through 6E and FIGS. 7-1 and 7-2, each slidable tamper member 370 has, in addition to a tamper blade 374, a pair of through bores 376 and a spring-receiving chamber 378, and further has an anvil 380 engageable by a cap 382 (FIGS. 1 and 2) at the end of a piston rod 372. Referring to FIGS. 3 and 4, each tamper assembly 368 additionally includes a support pad 384 mounted on one of the slides 290 and 292 (there being two support pads 384 on each slide 290 and 292) to which guide pins 386 are press fit and a coil spring 388 extending into the associated spring-receiving chamber 378 and bearing against a support pad 384. The guide pins 386 are slidably received within the through bores 376 so that the tamper members 370 can slide laterally relative to the slides 290 and 292.

Figure 5A:
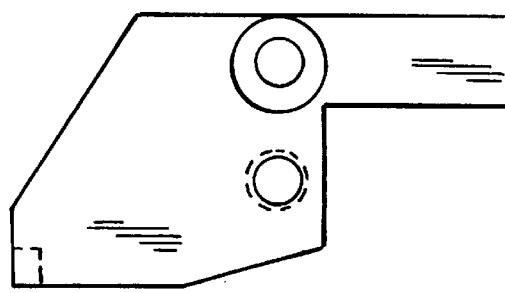
FIGS. 5A, 5B and 5C are, respectively, a plan view, a rear elevational view, and a side elevational view of a spring retainer and tamper stop plate in accordance with this invention.
Figure 5C:
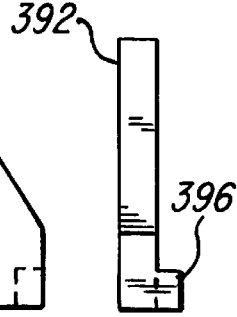
Figure 5B:
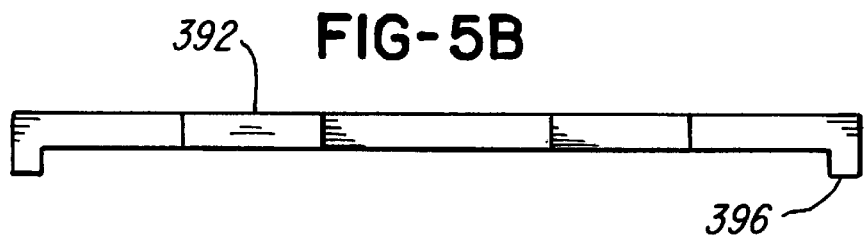

Further in accordance with this invention, the upper and lower spring retainer plates 298 and 300 of U.S. Pat. No. 5,090,108, are replaced by an upper retainer plate 392 and an identical lower retainer plate 394. Upper retainer plate 392 is shown best in FIGS. 5A, 5B, and 5C. The upper plate 392 has downwardly extending lugs or flanges 396 which restrict the range of the sliding movement of the upper tamper members 370 so that they can not be driven off the free ends of the guide pins 386. With reference to FIGS. 1 through 4, the lower retainer plate 394 similarly has upwardly extending lugs or flanges 398 which likewise restrict the range of sliding movement of the lower tamper members 370.

In operation, when the robot end effector 262 is manipulated to place a coil lead wire across the inner end of a terminal 52, the associated tamper member 370 is driven by the associated air actuator 364 toward the level of the base of the terminal trough. This causes the tamper blade 374 to engage the coil lead and hold it in the trough. The tamper member 370 remains engaged with the lead wire until the end effector has fully inserted the lead wire into the terminal trough and crimped the lead wire to the terminal. The tamper member 370 is then retracted by the bias of its coil spring 388. The process is repeated for all of the coil lead wire connections.

A benefit of this invention that is not immediately evident is that, upon retraction of each tamper member 370, the section of the coil lead wire freshly crimped to a terminal 52 which has been engaged by the tamper blade 372 is free to move slightly away from bottom of the terminal trough and is, therefore, not subject to the stress, due to being drawn taut, to which such sections of coil lead wires are often placed in other coil lead wire connection methods.

Although the presently preferred embodiment of this invention has been described, it will be understood that within the purview of this invention various changes may be made within the scope of the following claims.

Having thus described my invention, I claim:

1. In a method of manufacturing stators of the type having a stator core having an end face with terminal-receiving sockets and terminals held by said sockets, each of said terminals having a longitudinally-extending, wire-receiving trough, a pair of coils wound on said stator core, each coil having at least one pair of lead wires extending therefrom, each said lead wire having a fixed end extending from a stator coil and a free end held by a clamp so that it extends alongside its associated said socket, and said method including providing a terminal crimping member operable in response to movements of a pliers-like robot end effector to crimp a portion of one of the terminals on said stator to a segment of a lead wire, the improvement comprising the steps of providing said terminal crimping member with plural slidable wire tampers, one for each of said terminals, driving one of said tampers toward the bottom of the trough of its associated terminal when the robot end effector is manipulated to place a coil lead wire in the channel and retaining said coil lead wire in its associated channel until it is crimped to its associated terminal.

2. The method of claim 1 wherein said step of driving one of said tampers and retaining said coil lead wire are repeated for each of said coil lead wires.

3. In an apparatus for manufacturing stators of the type having a stator core having an end face with terminal-receiving sockets and terminals held by said sockets, each of said terminals having a longitudinally-extending, wire-receiving trough, a pair of coils wound on said stator core, each coil having at least one pair of lead wires extending therefrom, each said lead wire having a fixed end extending from a stator coil and a free end held by a clamp so that it extends alongside its associated said socket, and said apparatus including a terminal crimping member having a body and operable in response to movements of a pliers-like robot end effector to crimp a portion of one of the terminals on said stator to a segment of a lead wire, the improvement wherein said crimping member has plural movable wire tampers members mounted on said body, one for each of said terminals, and plural air actuators, one for each of said tampers, that move said tampers toward the bottoms of the troughs of said terminals when the robot end effector is manipulated to place the coil lead wires in the troughs.

4. The improvement of claim 3 wherein said wire tampers are slidable mounted relative to said body and spring biased away from the terminals by springs located between said tampers and said body.

\* \* \* \* \*